UNITED STATES PATENT OFFICE.

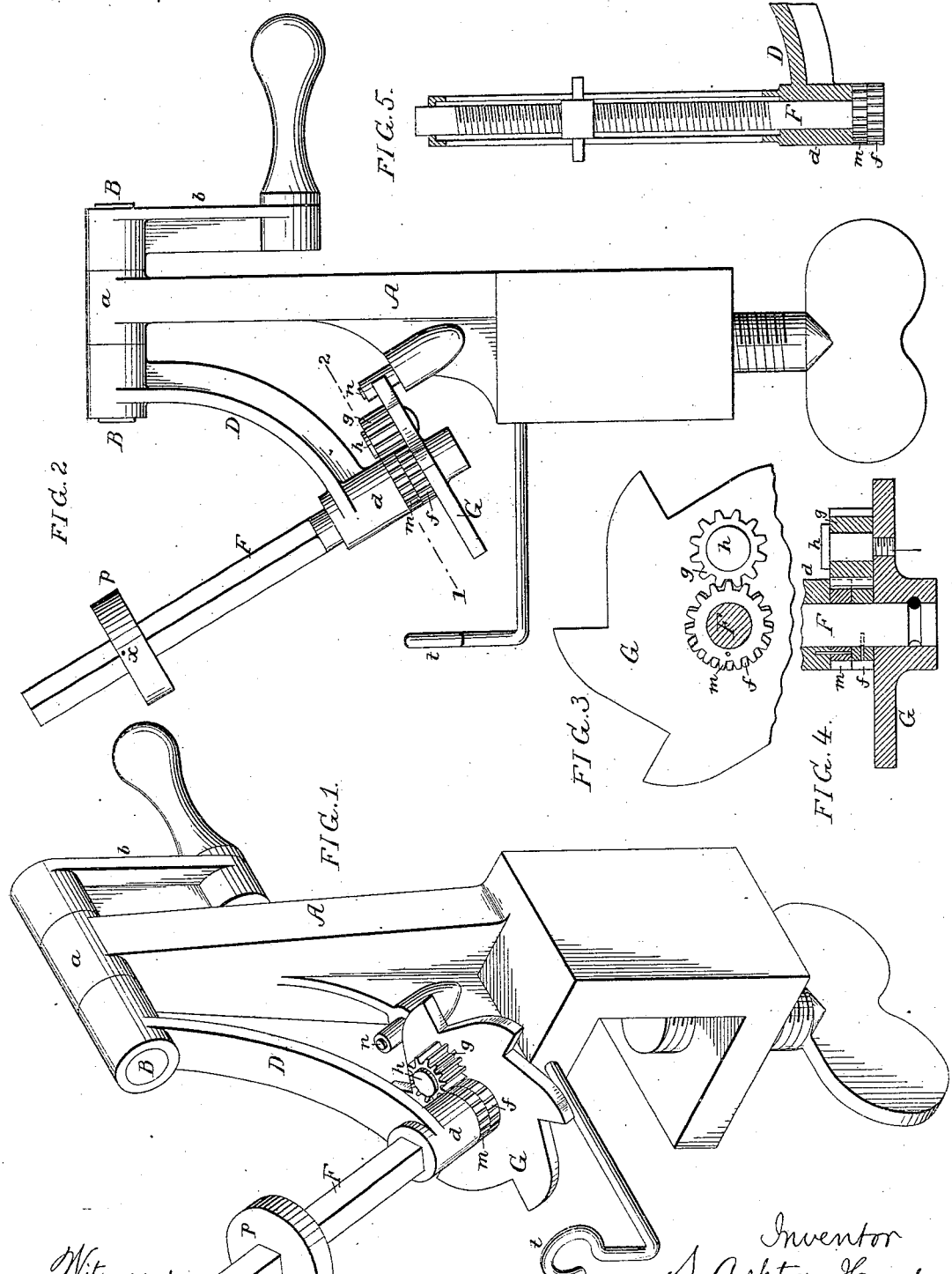

S. ASHTON HAND, OF TOUGHKENAMON, PENNSYLVANIA.

MECHANICAL MOVEMENT.

SPECIFICATION forming part of Letters Patent No. 313,324, dated March 3, 1885.

Application filed January 19, 1885. (No model.)

*To all whom it may concern:*

Be it known that I, S. ASHTON HAND, a citizen of the United States, and a resident of Toughkenamon, Chester county, Pennsylvania, have invented a certain new Mechanical Movement, of which the following is a specification.

The object of my invention is to provide means whereby a movement in an inclined or conical path, and also, if desired, around its own axis, may be imparted to a shaft or bar from another shaft turning in fixed bearings, and this object I attain in the manner which I will now proceed to describe, reference being had to the accompanying drawings, in which—

Figure 1 is a perspective view of a device embodying my invention; Fig. 2, a side view of the same; Figs. 3 and 4, sectional views on a larger scale of part of the device, and Fig. 5 a view illustrating a modified form of the device.

In the device shown in Figs. 1 and 2, A is a standard or bracket provided at the lower end with a suitable clamp, and having at the upper end a bearing, $a$, for a shaft, B, which has at one end an operating crank or handle, $b$, and at the opposite end a curved arm, D, the latter having a boss, $d$, which forms a bearing for the shaft F, inclined or set obliquely in respect to the axis of the shaft B.

Turning loosely on the lower end of the shaft F is a toothed disk, G, and secured to or forming part of said shaft F is a spur-wheel, $f$, which gears into a pinion, $g$, carried by a stud, $h$, on the disk G and gearing into a spur-wheel, $m$, secured to the boss $d$ of the arm D.

On the standard A is a pin, $n$, preferably clothed with rubber or some other elastic material, and as the arm D rotates this pin comes into the path of the teeth of the disk G, one of which strikes the pin and causes a partial rotation of the disk on each revolution of the shaft B, this movement being transmitted to the shaft F, but being very much reduced in extent, for the gearing whereby the movement is transmitted is differential—that is to say, the spur-wheel $f$ has one or more teeth more or less than the spur-wheel $m$—so that as the pin $g$ is carried round by the disk G, in gear with both wheels, there will be a movement of the shaft F to the extent of one or more teeth of the wheel $f$ for each complete revolution of the disk G. When the shaft B is rotated, the shaft F will thus travel in a conical path of which the point $x$ is the apex, and at the same time will have a slow movement of rotation around its axis.

The differential gear may be dispensed with when this slow movement is not necessary, the disk G in such cases being attached, if desired, directly to the shaft F; or in some cases it may not be necessary for the shaft to turn on its own axis at all, in which case it may be rigidly secured to the arm D.

The compound movement is available for various purposes. For instance, in Figs. 1 and 2 of the drawings I have shown the device as intended for winding yarn into balls, the shaft F having at the point $x$ a core-block, $p$, for the ball, and the standard A having an eye, $t$, in line vertically with this block and serving as a means for guiding the thread. The outer end of the shaft, however, might be furnished with a tool for acting upon the surface of a cone, for the purpose of cutting or polishing the same, for instance, and where it is necessary to feed the tool over the surface of the cone the tool may be guided by a sleeve surrounding the shaft and the latter may be threaded for adaptation to a nut on the tool, as shown in Fig. 5.

I claim as my invention—

1. The combination of a bearing, a shaft, B, adapted thereto, and an arm thereon carrying a shaft or bar, the axis of which is at an oblique angle to the axis of the shaft B, as set forth.

2. The combination of the bearing, the shaft B, its arm D, the oblique shaft F, carried thereby, and means for rotating the said shaft F on its own axis as it is carried around by the arm, as set forth.

3. The combination of the bearing, the shaft B, its arm D, the oblique shaft F, carried thereby, the disk G, and the pin $n$, as set forth.

4. The combination of the bearing, the shaft B, its arm D, the oblique shaft F, carried thereby, and differential gearing for rotating the shaft, as set forth.

5. The combination of the bearing, the shaft B, its arm D, the oblique shaft F, carried thereby, the toothed disk G, the pin $n$, the differential spur-wheels $f$ and $m$, and the pinion $g$, carried by the disk and gearing into the wheels $m$ and $f$, as set forth.

6. The combination of the standard A, the shaft B, the arm D, the oblique shaft F, carried thereby, and the guide-eye $t$, as set forth.

7. The combination of the standard A, the shaft B, the arm D, the oblique shaft F, carried thereby, the core-block $p$ on said shaft, and the guide-eye $t$ in line with said block, as set forth.

In testimony whereof I have signed my name to this specification in the presence of two subscribing witnesses.

S. ASHTON HAND.

Witnesses:
 HENRY BOSSERT,
 HARRY SMITH.